(12) United States Patent
Ishii et al.

(10) Patent No.: US 9,047,551 B2
(45) Date of Patent: Jun. 2, 2015

(54) PRINTER

(71) Applicants: Hidekazu Ishii, Nagoya (JP); Keisuke Tomatsu, Nagoya (JP)

(72) Inventors: Hidekazu Ishii, Nagoya (JP); Keisuke Tomatsu, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/177,293

(22) Filed: Feb. 11, 2014

(65) Prior Publication Data

US 2014/0226170 A1      Aug. 14, 2014

(30) Foreign Application Priority Data

Feb. 14, 2013      (JP) .................. 2013-027015

(51) Int. Cl.
| | |
|---|---|
| G06F 3/12 | (2006.01) |
| G06K 15/02 | (2006.01) |
| B41J 3/407 | (2006.01) |
| B41J 3/46 | (2006.01) |
| G06K 15/00 | (2006.01) |

(52) U.S. Cl.
CPC ........... G06K 15/1806 (2013.01); B41J 3/4075 (2013.01); B41J 3/46 (2013.01)

(58) Field of Classification Search
CPC ................................................ G06K 15/1806
See application file for complete search history.

(56) References Cited

U.S. PATENT DOCUMENTS

| | | | |
|---|---|---|---|
| 5,621,864 A | 4/1997 | Benade et al. | |
| 5,704,722 A | 1/1998 | Kanou | |
| 6,722,563 B1 | 4/2004 | Johnson et al. | |
| 2005/0214053 A1 | 9/2005 | Ishii et al. | |
| 2006/0001913 A1* | 1/2006 | Akaiwa et al. | ............... 358/3.29 |
| 2012/0006892 A1 | 1/2012 | Jouvin et al. | |
| 2014/0354751 A1* | 12/2014 | Ishii et al. | ...................... 347/211 |
| 2014/0362157 A1* | 12/2014 | Tomomatsu et al. | .......... 347/218 |

FOREIGN PATENT DOCUMENTS

| | | |
|---|---|---|
| EP | 661649 A2 * | 7/1995 |
| JP | 2004299338 | 10/2004 |
| JP | 2012-176516 | 9/2012 |

OTHER PUBLICATIONS

Extended European Search Report issued in Application No. 14154861.0 on Jun. 13, 2014.

\* cited by examiner

*Primary Examiner* — Dov Popovici
(74) *Attorney, Agent, or Firm* — McCarter & English, LLP

(57) ABSTRACT

This disclosure discloses a printer includes a feeder, a printing head, a print object acceptance portion, a printing mode setting acceptance portion, a first and a second image creating portions, a first and a second display devices, an increment mode acceptance portion, an increment quantity acceptance portion, and a printing control portion. The print object acceptance portion accepts an input operation of the print object including a print identifier. The printing mode setting acceptance portion accepts a setting operation of printing modes. The increment mode acceptance portion accepts a setting operation of an increment mode. The increment quantity acceptance portion accepts a quantity setting operation of the printed matter to be produced. The printing control portion controls the feeder and the printing head so that the one first printed matter and the at least one second printed matter are created by using the printing mode setting.

6 Claims, 12 Drawing Sheets

PRINTER

CROSS-REFERENCE TO RELATED APPLICATION

The present application claims priority from Japanese Patent Application No. 2013-027015, which was filed on Feb. 14, 2013, the disclosure of which is incorporated herein by reference in its entirety.

BACKGROUND

1. Field

The present disclosure relates to a printer for continuously producing a plurality of printed matters, each having a print object.

2. Description of the Related Art

As a printer of a prior art, there has been known one for continuously producing a plurality of printed matters, each having a print object. This printer (a label writer) forms a print of the print object (characters and symbols) by printing means (a thermal head) on a print-receiving tape (a tape) fed by feeding means (a tape feeding motor) so as to continuously produce the plurality of printed matters (labels), each having the print object. The print object includes a print identifier (a numeral) capable of being incremented in compliance with predetermined regularity when the plurality of printed matters is produced continuously.

Here, in order to enable arrangement of each of the print objects and setting of various printing modes for each of the print objects, a plurality of blocks might be set in one printed matter, and one print object, for example, might be arranged in each block. Since the plurality of blocks is set in one printed matter, printing mode settings can be made different among the plurality of blocks, and various types of prints can be displayed for each block in one printed matter.

At this time, there might be a case in which a desired number of printed matters are to be produced while print formation contents of the printed matter for which the plurality of blocks is set are continuously changed in compliance with predetermined regularity. In such a case, it is extremely convenient if all the printed matters can be produced easily and efficiently with a simple operation. However, particular consideration has not been given to such a point in prior art technologies.

SUMMARY

The present disclosure has an object to provide a printer which can produce all the printed matters easily and efficiently with a simple operation if a desired number of printed matters are to be produced while print formation contents of the printed matter for which the plurality of blocks is set are continuously changed in compliance with predetermined regularity.

In order to achieve the above-described object, according to the aspect of the present application, there is provided a printer comprising a feeder configured to feed a print-receiving tape, and a printing head configured to apply print of a desired print object to the print-receiving tape fed by the feeder, the printer being configured to continuously produce a plurality of printed matters comprising the print object formed on the print-receiving tape, respectively, in a predetermined order extending along a transport direction of the feeder, the printer further comprising a print object acceptance portion configured to accept an input operation of the print object comprising a print identifier that is arranged in each of a plurality of blocks which can be set in plural in a tape length direction with respect to one the printed matter and is able to be incremented in compliance with predetermined regularity, a printing mode setting acceptance portion configured to accept a setting operation of printing modes different from each other for each of the plurality of blocks, a first image creating portion configured to create a first image of one first printed matter in which the plurality of blocks each comprising the print object is aligned in the tape length direction on the basis of an acceptance result of the print object acceptance portion and the printing mode setting acceptance portion, a first display device configured to display the first image created by the first image creating portion, an increment mode acceptance portion configured to accept a setting operation of an increment mode when the print identifier of the print object of each of the plurality of blocks of the first image is incremented for each printed matter, an increment quantity acceptance portion configured to accept a quantity setting operation of the printed matter to be produced, a second image creating portion configured to create a second image of at least one second printed matter in which the print identifier is incremented for each printed matter in the increment mode accepted by the increment mode acceptance portion and set to a quantity based on an acceptance result of the increment quantity acceptance portion, a second display device configured to display the first image and second image created respectively by the first image creating portion and second image creating portion together, and a printing control portion configured to control the feeder and the printing head so that the one first printed matter and the at least one second printed matter corresponding to the first image and second image displayed on the second display device are created by using the printing mode setting accepted by the printing mode setting acceptance portion.

In the printer of the present disclosure, a plurality of printed matters each having a print object (character strings, barcodes and the like) is continuously produced by means of print formation of the print object by a printing head on a print-receiving tape fed by a feeder.

At this time, in order to enable arrangement of the above described print object disposed on each of the printed matters and setting of various printing modes for each of the print objects, in the present disclosure, a plurality of blocks is set in each of the printed matters, and one print object, for example, is arranged in each block. When an operator performs printing mode setting operations different from each other for each of the plurality of blocks, the setting operation is accepted by printing mode setting acceptance portion. Examples of the printing mode settings include format setting of a font and the like in the character string, style setting such as italic, bold and the like in the character string, setting of a character-string extending direction such as vertical writing/lateral writing, setting of a character direction by rotation of characters in the character string (so-called rotate), object type setting such as a text character, a barcode and the like. Moreover, in the present disclosure, the print object includes a print identifier (numerals, alphabets and the like, for example) capable of being incremented in compliance with predetermined regularity when the plurality of printed matters is to be produced continuously as above. If the operator performs an input operation of the print object including the print identifier, the input operation is accepted by the print object acceptance portion. If the operation by the operator is accepted as above, on the basis of the acceptance result, a first image of a first printed matter in which the print objects are included in the plurality of blocks and a printing mode of each of the print objects is set to modes different from each other as described above is created by first image creating portion and displayed by first display device.

Moreover, the present disclosure is configured such that a print identifier included in the print object of each of the above described blocks is capable of being incremented for each printed matter. The operator can make setting relating to an increment of each of the printed matters. That is, if the operator performs a setting operation of an increment mode when the print identifier is to be incremented for each printed matter (such that the alphabet is incremented in a descending order, numerals are incremented by increasing two each, the print identifier of each of the plurality of blocks is incremented in synchronization, the print identifier of each of the plurality of blocks is incremented individually and alternately and so on, for example), the setting operation is accepted by the increment mode acceptance portion. Moreover, if the operator performs a quantity setting operation of the printed matter to be produced while executing the increment, the setting operation is accepted by increment quantity acceptance portion. If the operation by the operator is accepted as above, on the basis of the acceptance result, a second image (separate from the first image) of a second printed matter of the quantity (the number of sheets) on the basis of the acceptance result, whose print identifier is incremented in the accepted increment mode is created by second image creating portion. The first image already created by the first image creating portion and the second image created by the second image creating portion are displayed by second display device.

Subsequently, on the basis of control of print control portion, one first printed matter based on the first image displayed as above and at least one second printed matter based on the subsequent second image displayed as above are created in collaboration of feeder and printing head. At this time, in each of the printed matters, print formation is executed so that the printing modes are different from each other in compliance with the accepted printing mode setting in the plurality of blocks.

As described above, in the present disclosure, the plurality of blocks is set in each of the printed matters. As a result, the printing mode setting can be made different among the plurality of blocks and various types of prints can be displayed for each block in one printed matter. Moreover, it becomes possible to uniformly arrange each block in the printed matter, to form print such as a partition line and the like between the blocks and so on. As a result of these arrangements, expressive power by the printed matter can be widely expanded, and convenience for the operator can be improved.

Moreover, even if the plurality of blocks is set in one printed matter as above, the print identifier of the print object included in each of the blocks can be incremented by the unit of the printed matter (not by the unit of the block). As a result, if a desired number of sheets are to be produced while the print formation contents in the printed matter including the plurality of blocks are continuously changed in compliance with the predetermined regularity, all the printed matters can be produced easily and efficiently with a simple operation.

DETAILED DESCRIPTION OF THE PREFERRED EMBODIMENTS

An embodiment of the present disclosure will be described below by referring to the attached drawings. In the present embodiment, a case in which a printer of the present disclosure is applied to a handheld print label producing apparatus will be described. If there are notes of "front", "rear", "left", "right", "upper", and "lower" in the figures, the "front", "rear", "left", "right", "upper", and "lower" in explanation of the description refer to a direction as noted.

First, by referring to FIG. 1, an entire configuration of the handheld print label producing apparatus of the present embodiment will be described.

Figure 1:
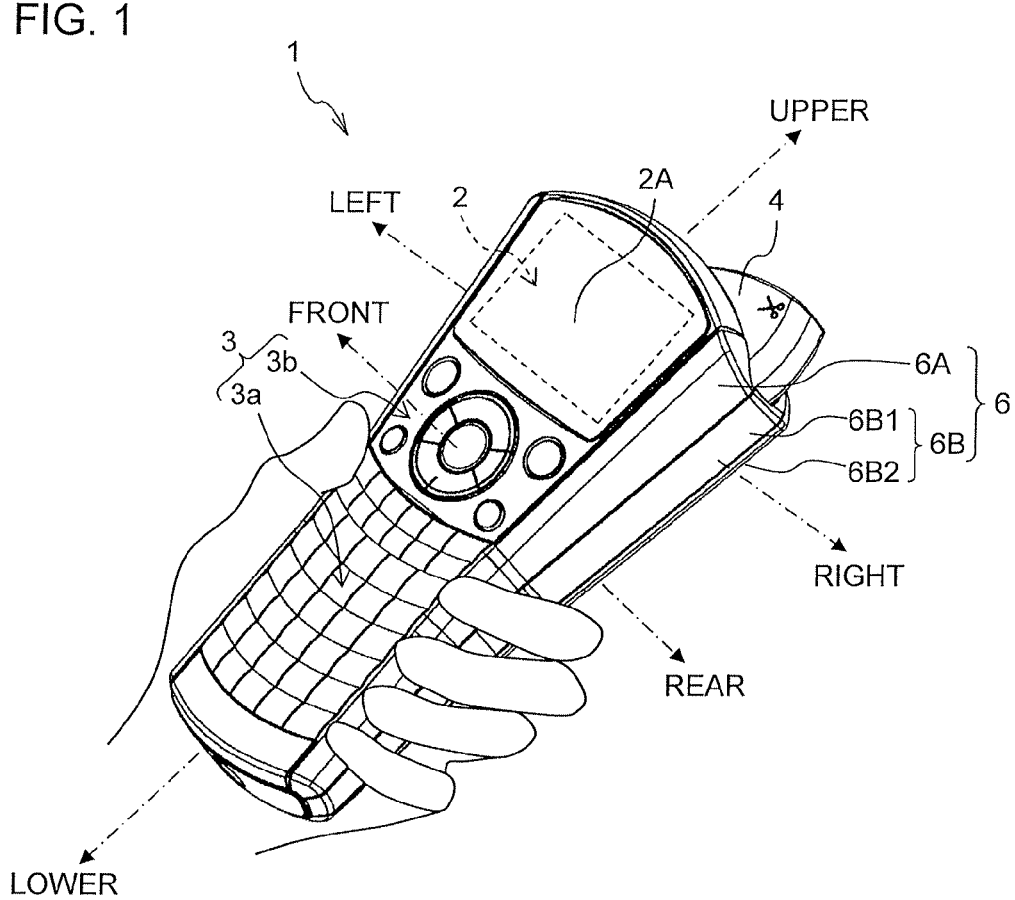
FIG. 1 is a perspective view illustrating an entire configuration of a handheld print label producing apparatus of an embodiment of the present disclosure.

As illustrated in FIG. 1, a handheld print label producing apparatus 1 is a handheld print label producing apparatus gripped by the hand of an operator. A housing 6 of this handheld print label producing apparatus 1 includes a front cover 6A constituting a front surface of the apparatus and a rear cover 6B constituting a rear surface of the apparatus.

A liquid crystal display portion 2 for making various types of display is disposed on an upper side of the front cover 6A. The front surface of the liquid crystal display portion 2 is covered by a cover panel 2A formed of a transparent acrylic plate or the like, for example. On a lower side of the liquid crystal display portion 2, a keyboard portion 3 for performing various operations is disposed. The keyboard portion 3 includes character keys 3a for inputting characters (including symbols and numerals) and various function keys 3b.

The rear cover 6B includes a rear cover body 6B1 and a detachable cover 6B2 capable of being removed from the rear cover body 6B1. On an upper right end of the rear cover body 6B1, a cut button 4 for driving a cutter (not shown) for cutting a label tape 80 with print (see FIG. 4 which will be described later) is disposed.

Next, by referring to FIGS. 2 and 3, an internal structure of the handheld print label producing apparatus 1 will be described.

Figure 2:
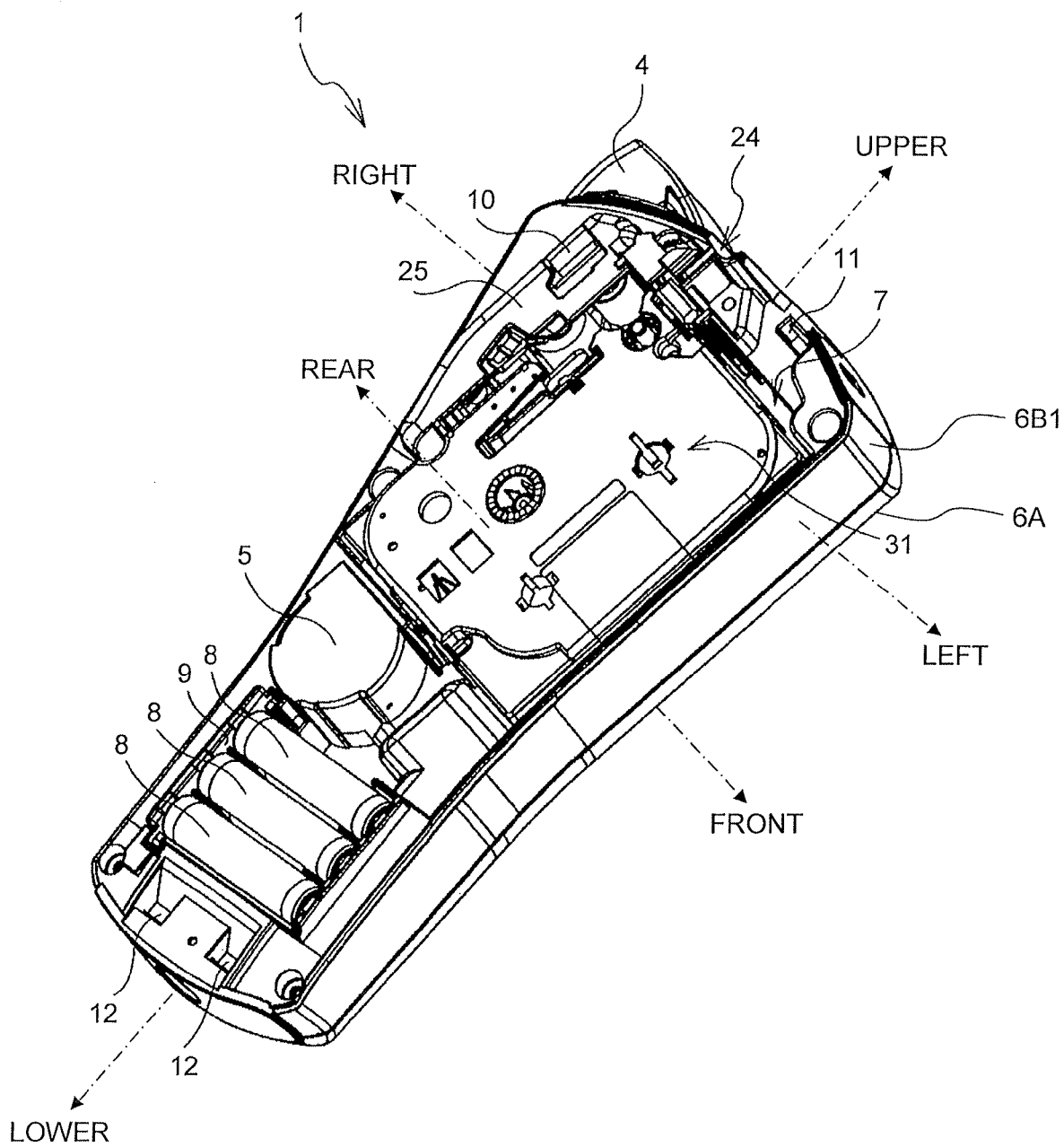
FIG. 2 is a perspective view illustrating an internal structure of the handheld print label producing apparatus in a state in which a removable cover is removed, and a cartridge is attached to a cartridge holder.
Figure 3:
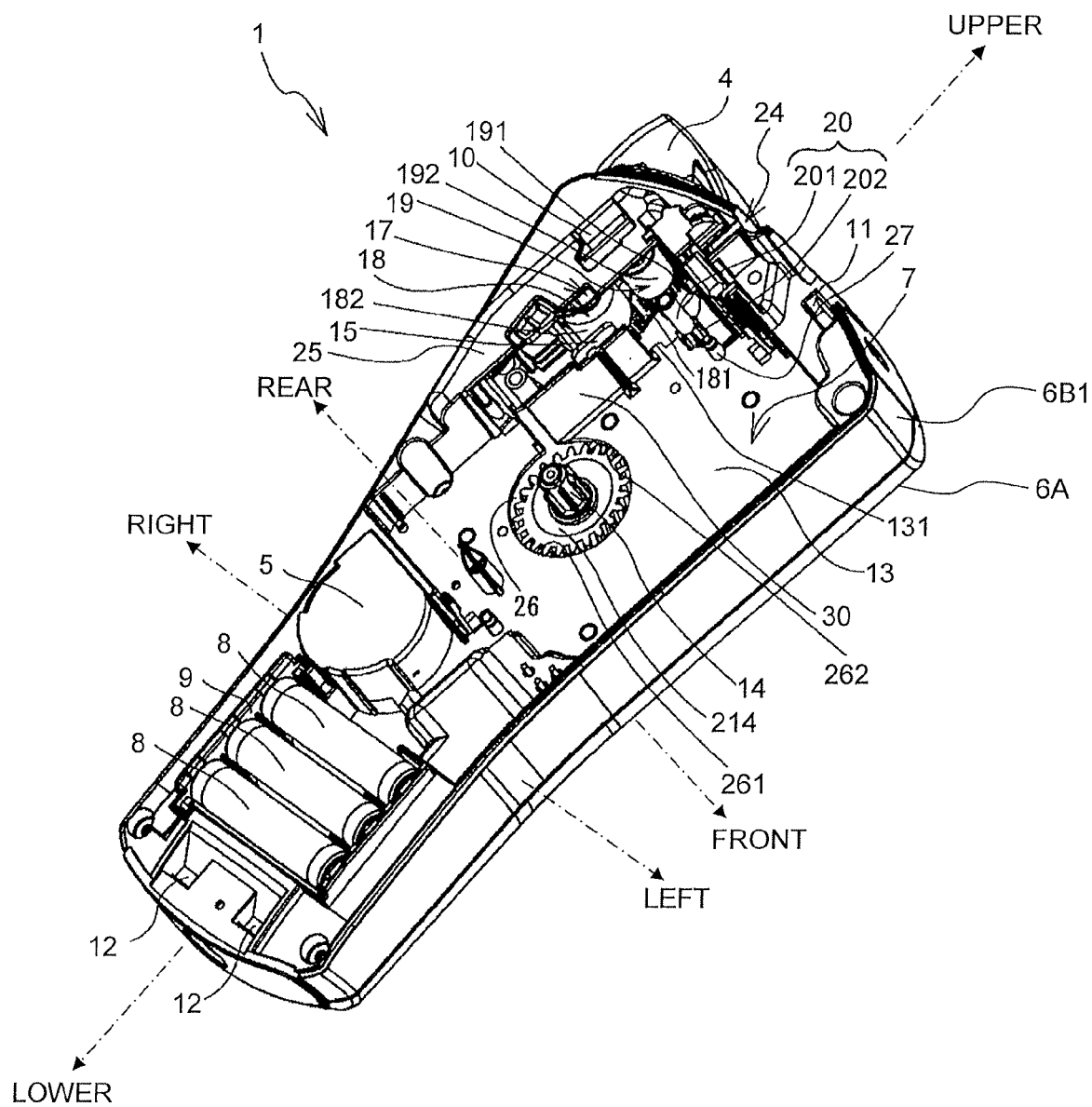
FIG. 3 is a perspective view illustrating an internal structure of the handheld print label producing apparatus in a state in which the removable cover is removed, and the cartridge is removed from the cartridge holder.

As illustrated in FIGS. 2 and 3, a recess-shaped cartridge holder 7 is disposed on an upper rear part of the rear cover body 6B1. With respect to the cartridge holder 7, a cartridge 31 supplying a cover film 51 and a base tape 53 (see FIG. 4 which will be described later for both) is detachably attached.

A motor accommodating portion 5 for accommodating a motor 21 (see FIG. 5 which will be described later) is disposed on a lower side of the cartridge holder 7. On a lower side of the motor accommodating portion 5, that is, on a lower part of the rear cover body 6B1, a battery accommodating portion 9 for accommodating a battery 8 is disposed. The motor 21 is driven by electric power supplied from the battery 8 and drives a ribbon take-up spool 57, a platen roller 182, and a pressing roller 192 (all of them will be described in detail later).

On an upper side of the cartridge holder 7, a tape discharging slit 24 for discharging the label tape 80 with print to an outside is disposed. Moreover, on an upper right part of the cartridge holder 7, a roller holder 17 (details will be described later) is disposed, and a plate-shaped plate portion 25 is disposed on a rear side of the roller holder 17. On an upper part of the plate portion 25, a projection portion insertion port 10 which is an opening portion is disposed. When the above described detachable cover 6B2 is detached from/attached to the rear cover body 6B1, a projection portion (not shown) disposed on the detachable cover 6B2 is inserted into/removed from the projection portion insertion port 10. As a result, the roller holder 17 can be moved to a print position (a position illustrated in FIG. 4 which will be described later) or to a standby position (not shown).

Moreover, a lock hole 11 is disposed on an upper end portion of the rear cover body 6B1, and lock holes 12 are disposed at two spots on a lower end portion. When the above described detachable cover 6B2 is attached to the rear cover body 6B1, lock members (not shown) disposed on the detachable cover 6B2 are fitted in the respective lock holes 11 and 12. As a result, natural opening of the detachable cover 6B2 is suppressed.

A bottom surface of the cartridge holder 7 includes a frame 13. A frame end 131 which is a right end portion of the frame 13 is disposed on a further right side of a rib 30 and a roller shaft 20 (details of the both will be described later). A gear concave portion 26 is disposed at a substantially center part of the frame 13, a gear 214 is disposed on the gear concave portion 26. A gear concave portion first opening 261 is disposed on a lower side of the gear concave portion 26, and a gear concave portion second opening 262 is disposed on an upper side of the gear concave portion 26. A gear 214 is meshed with gears (not shown) disposed on a surface on a front side of the frame 13 through the gear concave portion first opening 261 and the gear concave portion second opening 262, respectively. On a rear side of this gear 214, a ribbon take-up shaft 14 for taking up an ink ribbon 55 (see FIG. 4 which will be described later) is installed upright. By this configuration, power of the motor 21 is transmitted by the above described plurality of gears, and the gear 214 and the ribbon take-up shaft 14 rotate. A gear shaft (not shown) rotatably supporting a plurality of gears disposed on the surface on the front side of the frame 13 including the gear 214 and the above described two gears meshed with the gear 214 is formed integrally with the frame 13.

FIG. 3 illustrates a state in which a teeth part of the gear 214 is exposed for explanation, but in actuality, the teeth part of the gear 214 is covered by a concealing umbrella portion (not shown) and has a structure not to be exposed.

Figure 4:
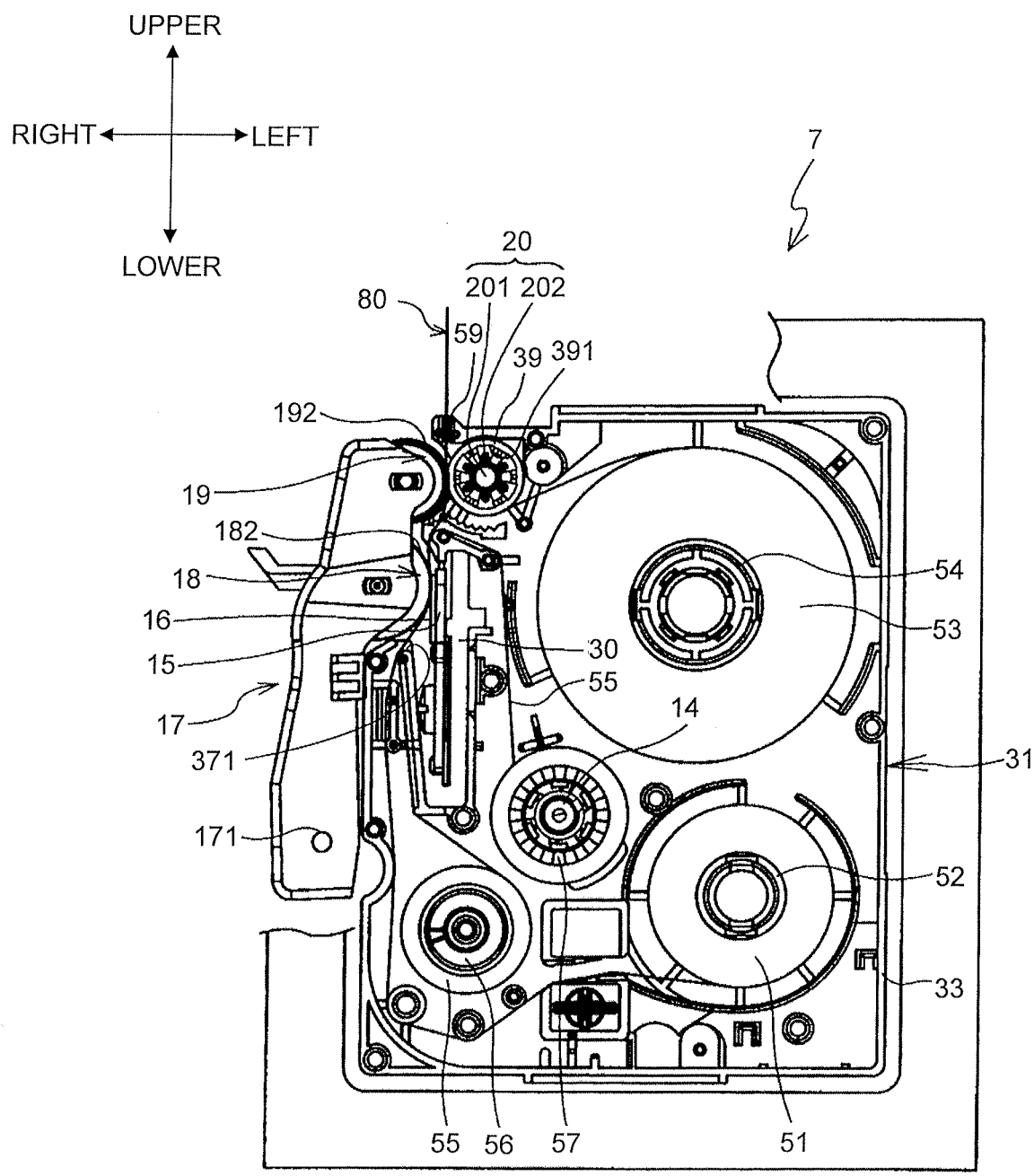
FIG. 4 is a plan view illustrating an internal structure of the cartridge.

The rib 30 is installed upright on a right side of the ribbon take-up shaft 14 (see also FIG. 4). A rectangular heat sink 15 is disposed on a right side surface of the rib 30. A thermal head 16 (see FIG. 4 which will be described later) having a plurality of heat generating elements is disposed on a right side surface of the heat sink 15.

Moreover, the roller shaft 20 is installed upright in the frame 13 between the rib 30 and the tape discharging slit 24. The roller shaft 20 is formed integrally with the frame 13. This roller shaft 20 includes a columnar-shaped columnar portion 201 and six ribs 202 formed radially outward from an outer periphery of the columnar portion 201 (see also FIG. 4 which will be described later). Moreover, the roller shaft 20 is inserted into a shaft hole 391 (see FIG. 4 which will be described later) of a tape feeding roller 39 disposed on the cartridge 31 and rotatably supports the tape feeding roller 39. A projecting portion 27 is installed upright on a left side of the roller shaft 20. The projecting portion 27 is to position the cartridge 31 in a front-back direction by being inserted into a concave portion (not shown) of the cartridge 31.

Next, an internal structure of the cartridge 31 will be described by referring to FIG. 4.

As illustrated in FIG. 4, on a lower left part in a cartridge case 33 of the cartridge 31 attached to the cartridge holder 7, a cover film spool 52 around which a cover film 51 in a transparent film state is wound is rotatably arranged. The cover film 51 fed out of the cover film spool 52 is guided toward a cartridge opening 371 and discharged out of the cartridge opening 371.

On a lower right part in the cartridge case 33, a ribbon spool 56 around which the ink ribbon 55 is wound is rotatably arranged. The ink ribbon 55 fed out of the ribbon spool 56 is guided toward the cartridge opening 371 and is discharged with the cover film 51 from the cartridge opening 371.

The ribbon take-up spool 57 is rotatably arranged between the cover film spool 52 and the ribbon spool 56. By means of rotation of the above described gear 214 to which power is transmitted from the above described motor 21, the ribbon take-up shaft 14 installed upright on the rear side of the gear 214 rotates, and the ribbon take-up spool 57 rotates. As a result, the ink ribbon 55 is pulled out of the ribbon spool 56, and the consumed ink ribbon 55 is taken up.

A base tape spool 54 around which a base tape 53 is wound is rotatably arranged on an upper part in the cartridge case 33. The base tape 53 fed out of the base tape spool 54 is guided toward the tape feeding roller 39, and the base tape 53 and the cover film 51 with print are pressed into contact by the tape feeding roller 39 and the pressing roller 192 (details will be described later) so as to become the label tape 80 with print and is fed toward the tape discharging exit 59.

Moreover, on a right side of the cartridge 31 attached to the cartridge holder 7, the arm-shaped roller holder 17 having a platen roller unit 18 and a pressing roller unit 19 is disposed capable of swing in a right-and-left direction around a pivotally supporting portion 171 (see also FIG. 3). When the above described detachable cover 6B2 is attached, the roller holder 17 is moved in a direction of the cartridge 31 by the projecting portion. As a result, the pressing roller unit 19 and the platen roller unit 18 disposed on the roller holder 17 are moved to the print position (the position illustrated in FIG. 4).

The platen roller unit 18 is arranged on the right side of the heat sink 15. The platen roller 182 and a platen roller gear 181 (see FIG. 3) are disposed on this platen roller unit 18. The platen roller 182 is arranged at a position facing the thermal head 16 disposed on the right side surface of the heat sink 15. The thermal head 16 applies a print of a print object such as a desired character string (including one character), a barcode (including both a one-dimensional code and a two-dimensional code) and the like to the cover film 51 fed by the platen roller 182, the pressing roller 192 and the like. The platen roller gear 181 is meshed with a gear (not shown) disposed on the front side of the frame 13, and by means of rotation of the platen roller gear 181 to which power is transmitted from the above described motor 21, the platen roller 182 rotates. As a result, when the platen roller unit 18 is moved to the print position, the platen roller 182 feeds the cover film 51 with print in a direction of the pressing roller unit 19 by its rotation while pressing the cover film 51 and the ink ribbon 55 onto the thermal head 16.

On the pressing roller unit 19, the pressing roller 192 and a pressing roller gear 191 (see FIG. 3) are disposed. The pressing roller 192 is arranged at a position facing the roller shaft 20. The pressing roller gear 191 is meshed with a gear (not shown) disposed on the front side of the frame 13, and by rotation of the pressing roller gear 191 to which power is transmitted from the above described motor 21, the pressing roller 192 rotates. As a result, when the pressing roller unit 19 is moved to the print position, the pressing roller 192 presses the cover film 51 and the base tape 53 onto the tape feeding roller 39 rotatably supported by the roller shaft 20. As a result, the cover film 51 with print and the base tape 53 are pressed into contact and become the label tape 80 with print and is discharged to an outside of the cartridge 31 from the tape discharging exit 59. Subsequently, the label tape 80 with print is guided toward the above described tape discharging slit 24 and is discharged to the outside of the handheld print label producing apparatus 1 from the tape discharging slit 24.

Next, a control system of the handheld print label producing apparatus 1 will be described by referring to FIG. 5.

Figure 5:
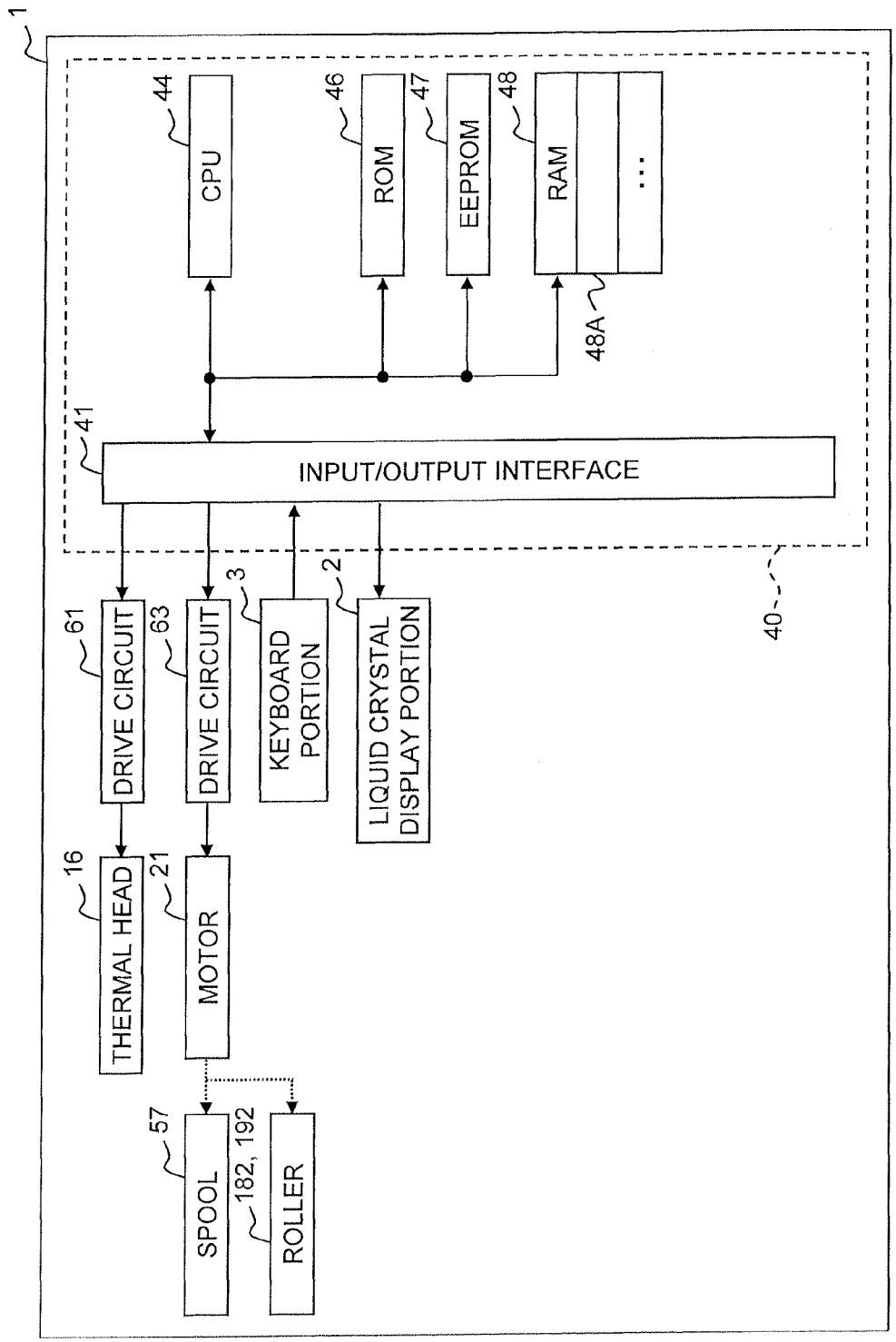
FIG. 5 is a block diagram illustrating a control system of the handheld print label producing apparatus.

As illustrated in FIG. 5, a control circuit 40 is arranged on a control substrate (not shown) of the handheld print label producing apparatus 1. In the control circuit 40, a CPU 44 is disposed, and a ROM 46, a RAM 48, an EEPROM 47, and an input/output interface 41 are connected to the CPU 44 through a data bus. A non-volatile memory such as a flash memory may be used instead of the EEPROM 47.

The ROM 46 stores various programs required for control of the handheld print label producing apparatus 1. The CPU 44 performs various calculations on the basis of the various programs stored in this ROM 46.

The RAM 48 temporarily stores various calculation results by the CPU 44. In this RAM 48, a label image memory 48A and the like are disposed.

The EEPROM 47 stores various types of information.

To the input/output interface 41, a thermal head drive circuit 61, a motor drive circuit 63, a keyboard portion 3, a liquid crystal display portion 2 and the like are connected.

The thermal head drive circuit 61 drives the thermal head 16.

The motor drive circuit 63 rotates the above described gear 214 by driving the motor 21. By means of rotation of the gear 214, the above described ribbon take-up shaft 14 is rotated, and the ribbon take-up spool 57 is rotated. Moreover, the rotation of the gear 214 is transmitted to the above described platen roller gear 181 and the pressing roller gear 191, and rotation of the platen roller gear 181 and the pressing roller gear 191 rotates the platen roller 182 and the pressing roller 192.

In the control system using such the control circuit 40 as a core, if the operator inputs a desired label production instruction through the keyboard portion 3, the platen roller 182, the pressing roller 192 and the like are driven through the motor drive circuit 63 and the motor 21, and feeding of the cover film 51 and the like is performed. In synchronization with that, the plurality of heat generating elements of the thermal head 16 is selectively heated and driven through the thermal head drive circuit 61, and the print object is printed on the cover film 51 being fed. As a result, the print label on which the print object is formed on the cover film 51 is finally produced.

Here, the handheld print label producing apparatus 1 can continuously produce a plurality of the print labels in a predetermined order extending along the transport direction of the platen roller 182, the pressing roller 192 and the like. At this time, in order that each of the print objects is arranged and various printing modes can be set for each of the print objects (in other words, by the unit of the print object), in the present embodiment, a plurality of blocks which can be set in plural in a tape length direction with respect to one print label is aligned in the tape length direction in each of the print labels, and one print object is arranged for each of the blocks. Moreover, in the present embodiment, the print object of each of the blocks includes a print identifier which can be incremented in compliance with predetermined regularity when the plurality of print labels is continuously produced as above. For example, if the print object is a character string, numerals, alphabets and the like included in the character string are print identifiers, and if the print object is a barcode, the barcode itself expressing the numerals, alphabets and the like is the print identifier. A greatest feature of the present embodiment is that, when a plurality of the print labels is to be continuously produced, the print identifiers included in the print object of each of the blocks in one print label are incremented for each of the print labels (in other words, by the unit of the print label). The details will be sequentially described below using a specific example by referring to FIGS. 6A and 6B and FIGS. 7A to 7C.

For example, if the operator performs a quantity setting operation of the block in one print label through the keyboard portion 3 in a state in which an appropriate screen (not shown) is displayed on the liquid crystal display portion 2, the setting operation is accepted. Subsequently, if the operator performs the input operation of the print object including the print identifier to be arranged in each of the blocks in the accepted quantity through the keyboard portion 3, the input operation is accepted. Then, if the operator performs a setting operation of printing modes different from each other for each of the blocks in the accepted quantity through the keyboard portion 3, the setting operation is accepted. Examples of the printing mode setting, here, include format setting (setting of font, font size and the like), style setting (setting of bold, italic and the like), character string extending direction setting (setting of lateral writing/vertical writing), setting of a character direction (setting of so-called rotation) and the like.

If each of the operations has been accepted as above, a first label image obtained by converting one first print label into an image is created on the basis of the acceptance result and displayed on the liquid crystal display portion 2.

Figure 6A:
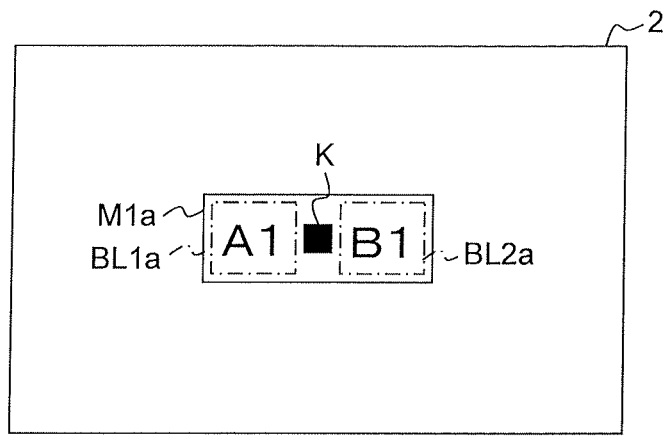
FIGS. 6A and 6B are explanatory diagrams each illustrating a specific example of a first label image.

For example, in an example illustrated in FIG. 6A, a quantity of the blocks in one print label is set to "two", a character string "A1" is inputted as the print object of a first block BL1a, a character string "B1" is inputted as the print object of a second block BL2a, a printing mode for the first block BL1a is set as appropriate, and the printing mode for the second block BL2a is set as appropriate so that one first label image M1a is created and displayed on the liquid crystal display portion 2.

In the first label image M1a, two blocks, that is, the block BL1a including the character string "A1" and the block BL2a including the character string "B1" are aligned in a tape longitudinal direction, and a new block mark K is arranged between these continuous two blocks BL1a and BL2a. In the character string "A1" of the block BL1a, both "A" and "1" included in the character string "A1" are print identifiers, and in the character string "B1" of the block BL2a, both "B" and "1" included in the character string "B1" are print identifiers. That is, the example illustrated in FIG. 6A is configured such that "A" and "1" included in the character string "A1" of the block BL1a and "B" and "1" included in the character string "B1" of the block BL2a can be incremented for each print label. At this time, each of the two blocks BL1a and BL2a includes setting information of the printing mode based on the setting operation of the accepted printing mode. In this example, each of the character strings "A1" and "B1" of the two blocks BL1a and BL2a is displayed in an existing mode, but this is not limiting, and display may be made in a mode corresponding to the setting information of the above described printing mode.

Figure 6B:
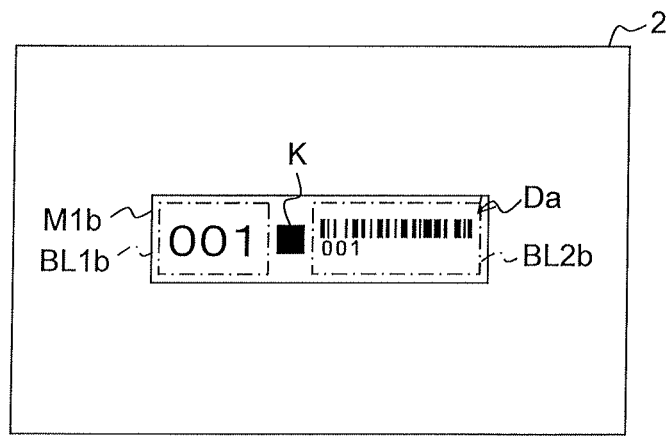

Moreover, in an example illustrated in FIG. 6B, for example, the quantity of the blocks in one print label is set to "two", a character string "001" is inputted as the print object of a first block BL1b, a barcode Da expressing the numerals "001" is inputted as the print object of a second block BL2b, the printing mode for the first block BL1b is set as appropriate, the printing mode for the second block BL2b is set as appropriate so that one first label image M1b is created and displayed on the liquid crystal display portion 2.

In the first label image M1b, two blocks, that is, the block BL1b including the character string "001" (a character string block) and the block BL2b including the barcode Da (a barcode block) are aligned in the tape longitudinal direction, and the new block mark K is arranged between these continuous two blocks BL1b and BL2b. In the character string "001" of the block BL1b, the character string "001" itself is a print identifier, and in the barcode Da of the block BL2b, the barcode Da itself expressing the numerals "001" is a print identifier. That is, the example illustrated in FIG. 6B is configured such that the character string "001" of the block BL1b and the barcode Da of the block BL2b can be incremented for each print label. At this time, each of the two blocks BL1b and BL2b includes setting information of the printing mode based on the setting operation of the accepted printing mode. In this example, the character string "001" and the barcode Da of the two blocks BL1b and BL2b, respectively, are displayed in the existing mode, but this is not limiting and they may be displayed in a mode corresponding to the setting information of the above described printing mode.

Then, after the first label image is displayed on the liquid crystal display portion 2, if the operator performs the setting operation of incrementing the print identifier included in the print object of each of the plurality of blocks in the first label image for each print label through the keyboard portion 3, the setting operation is accepted. Examples of setting relating to an increment for each print label here include setting of an increment pattern, setting of the print identifier to be incremented, setting of an "increment number" indicating a degree of one session of increment, setting of a "count number" indicating a number of times of increment and the like. In the present embodiment, two types of patterns, that is, a "synchronization pattern" and an "alternating pattern" are prepared as the above described increment patterns. The synchronization pattern is a pattern in which the print identifier included in the print object of each of the plurality of blocks in the first label image is synchronized and incremented for each print label. The alternating pattern is a pattern in which the print identifier included in the print object of each of the plurality of blocks in the first label image is individually and alternately incremented for each print label.

When the setting operation relating to an increment of each of the print labels has been accepted as above, the print identifier included in the print object of each of the plurality of blocks in the first label image is incremented for each print label on the basis of the acceptance result, and at least one second label image obtained by converting at least one second print label into an image is sequentially created and displayed on the liquid crystal display portion 2 together with the first label image so as to continue to the first label image. A collective name of the above described at least one second label image corresponds to the second image.

Figure 7A:
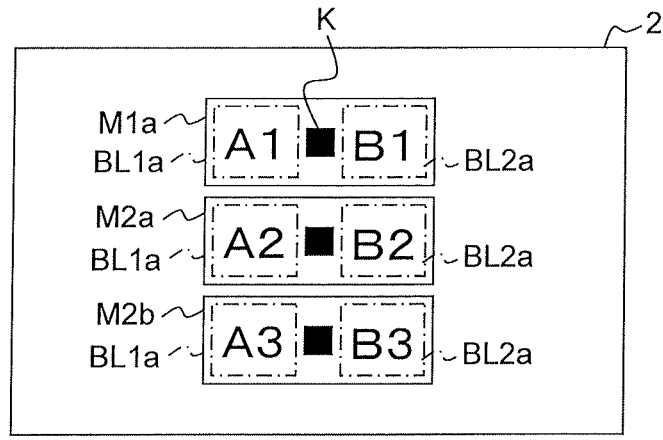
FIGS. 7A to 7C are explanatory diagrams each illustrating a specific example of the first and second label images.

For example, in an example illustrated in FIG. 7A, in the first label image M1a, the "synchronization pattern" is set as an increment pattern, "1" included in the character string "A1" of the first block BL1a and "1" included in the character string "B1" of the second block BL2a are set as the print identifiers to be incremented, "1" is set as the increment number, "2" is set as the count number, and "1" included in the character string "A1" of the block BL1a and "1" included in the character string "B1" of the block BL2a are synchronized and incremented by one for each print label so that two second label images M2a and M2b sequentially created are displayed on the liquid crystal display portion 2 together with the first label image M1a so as to continue to the first label image M1a.

In the second label image M2a, since the character string of the block BL1a becomes "A2" and the character string of the block BL2a becomes "B2" so that two blocks, that is, the block BL1a including the character string "A2" and the block BL2a including the character string "B2" are aligned in the tape longitudinal direction, and the new block mark K is arranged between these continuous two blocks BL1a and BL2a. In this example, the character strings "A2" and "B2" of the two blocks BL1a and BL2a, respectively, are displayed in the existing mode, but this is not limiting and they may be displayed in a mode corresponding to the setting information of the above described printing mode.

In the second label image M2b, the character string of the block BL1a becomes "A3" and the character string of the block BL2a becomes "B3" so that two blocks, that is, the block BL1a including the character string "A3" and the block BL2a including the character string "B3" are aligned in the tape longitudinal direction, and the new block mark K is arranged between these continuous two blocks BL1a and BL2a. In this example, the character strings "A3" and "B3" of these two blocks BL1a and BL2a, respectively, are displayed in the existing mode, but this is not limiting and they may be displayed in a mode corresponding to the setting information of the above described printing mode.

Figure 7B:
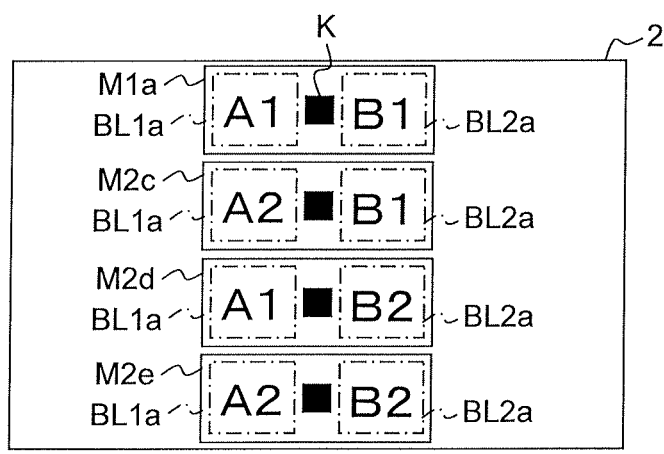

Moreover, for example, in an example illustrated in FIG. 7B, in the first label image M1a, the "alternating pattern" is set as an increment pattern, "1" included in the character string "A1" of the first block BL1a is set as the first print identifier to be incremented, "1" included in the character string "B1" of the second block BL2a is set as the second print identifier to be incremented, "1" is set as the increment number for each, "1" is set as the count number for each, and "1" included in the character string "A1" of the block BL1a and "1" included in the character string "B1" of the block BL2a are individually and alternately incremented by one for each print label in the order of "1" relating to the block BL1a and "1" relating to the block BL2a so that three second label images M2c, M2d, and M2e sequentially created are displayed on the liquid crystal display portion 2 together with the first label image M1a so as to continue to the first label image M1a.

In the second label image M2c, the character string of the block BL1a becomes "A2" and the character string of the block BL2a remains to be "B1", and thus, the two blocks, that is, the block BL1a including the character string "A2" and the block BL2a including the character string "B1" are aligned in the tape longitudinal direction, and the new block mark K is arranged between these continuous two blocks BL1a and BL2a. In this example, the character strings "A2" and "B1" of the two blocks BL1a and BL2a, respectively, are displayed in the existing mode, but this is not limiting and they may be displayed in a mode corresponding to the setting information of the above described printing mode.

In the second label image M2d, the character string of the block BL1a remains to be "A1" and the character string of the block BL2a becomes "B2", and thus, the two blocks, that is, the block BL1a including the character string "A1" and the block BL2a including the character string "B2" are aligned in the tape longitudinal direction, and the new block mark K is arranged between these continuous two blocks BL1a and BL2a. In this example, the character strings "A1" and "B2" of these two blocks BL1a and BL2a, respectively, are displayed in the existing mode, but this is not limiting and they may be displayed in a mode corresponding to the setting information of the above described printing mode.

In the second label image M2e, the character string of the block BL1a becomes "A2" and the character string of the block BL2a becomes "B2", and thus, the two blocks, that is, the block BL1a including the character string "A2" and the block BL2a including the character string "B2" are aligned in the tape longitudinal direction, and the new block mark K is arranged between these continuous two blocks BL1a and BL2a. In this example, the character strings "A2" and "B2" of the two blocks BL1a and BL2a, respectively, are displayed in the existing mode, but this is not limiting and they may be displayed in a mode corresponding to the setting information of the above described printing mode.

Figure 7C:
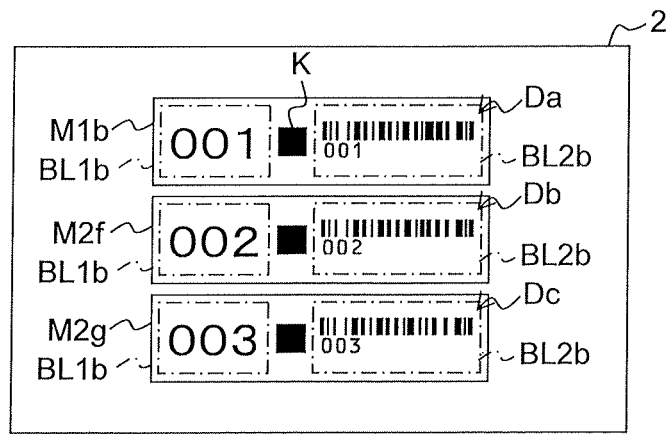

Moreover, for example, in an example illustrated in FIG. 7C, in the first label image M1b, the "synchronization pattern" is set as an increment pattern, the character string "001" of the first block BL1b and the barcode Da of the second block BL2b are set as the print identifiers to be incremented, "1" is set as the increment number, "2" is set as the count number, and the character string "001" of the block BL1b and the barcode Da of the block BL2b are synchronized and incremented by one for each print label so that two second label images M2f and M2g sequentially created are displayed on the liquid crystal display portion 2 together with the first label image M1b so as to continue to the first label image M1b.

In the second label image M2f, the character string of the block BL1b becomes "002" and the barcode of the block BL2b becomes a barcode Db expressing numerals "002", and thus, the two blocks, that is, the block BL1b including the character string "002" and the block BL2b including the barcode Db are aligned in the tape longitudinal direction, and the new block mark K is arranged between these continuous two blocks BL1b and BL2b. In this example, the character string "002" and the barcode Db of these two blocks BL1b and BL2b, respectively, are displayed in the existing mode, but this is not limiting and they may be displayed in a mode corresponding to the setting information of the above described printing mode.

In the second label image M2g, the character string of the block BL1b becomes "003" and the barcode of the block BL2b becomes a barcode Dc expressing numerals "003", and thus, the two blocks, that is, the block BL1b including the character string "003" and the block BL2b including the barcode Dc are aligned in the tape longitudinal direction, and the new block mark K is arranged between these continuous two blocks BL1b and BL2b. In this example, the character string "003" and the barcode Dc of these two blocks BL1b and BL2b, respectively, are displayed in the existing mode, but this is not limiting and they may be displayed in a mode corresponding to the setting information of the above described printing mode.

Then, after the first and second label images are displayed on the liquid crystal display portion 2, if the operator inputs a desired label production instruction through the keyboard portion 3, feeding of the cover film 51 and the like by the platen roller 182, the pressing roller 192 and the like and print of the print object on the cover film 51 fed as described above by the thermal head 16 are performed in accordance with the above described accepted printing mode setting, and finally, the one first print label corresponding to the first label image displayed as above and at least one second print label corresponding to the second label image displayed as described above are produced.

The first and second print labels produced as described above will be sequentially described below using specific examples by referring to FIGS. 8 to 12.

FIGS. 8 to 11 illustrate the first and second print labels L1a, L2a, and L2b corresponding to the first and second label images M1a, M2a, and M2b illustrated in the above described FIG. 7A.

In FIGS. 8 to 11, in the first print label L1a, the character string "A1" print-formed on the first block BL1a is included, and the character string "B1" print-formed on the second block BL2a is included. In the second print label L2a, the character string "A2" print-formed on the first block BL1a is included, and the character string "B2" print-formed on the second block BL2a is included. In the second print label L2b, the character string "A3" print-formed on the first block BL1a is included, and the character string "B3" print-formed on the second block BL2a is included. At this time, in the first and second print labels L1a, L2a, and L2b, the print is formed so that center positions BC1a and BC2a of the two blocks BL1a and BL2a, respectively, in the tape length direction match center positions RC1a and RC2a of the print objects of the blocks BL1a and BL2a, respectively, in the tape length direction. Moreover, in the first and second print labels L1a, L2a, and L2b, a partition line PL print-formed between the two blocks BL1a and BL2a is included. Moreover, at this time, in the first and second print labels L1a, L2a, and L2b, the print is formed so that the printing modes are different from each other in compliance with the above described accepted printing mode setting between the two blocks BL1a and BL2a.

Figure 8:
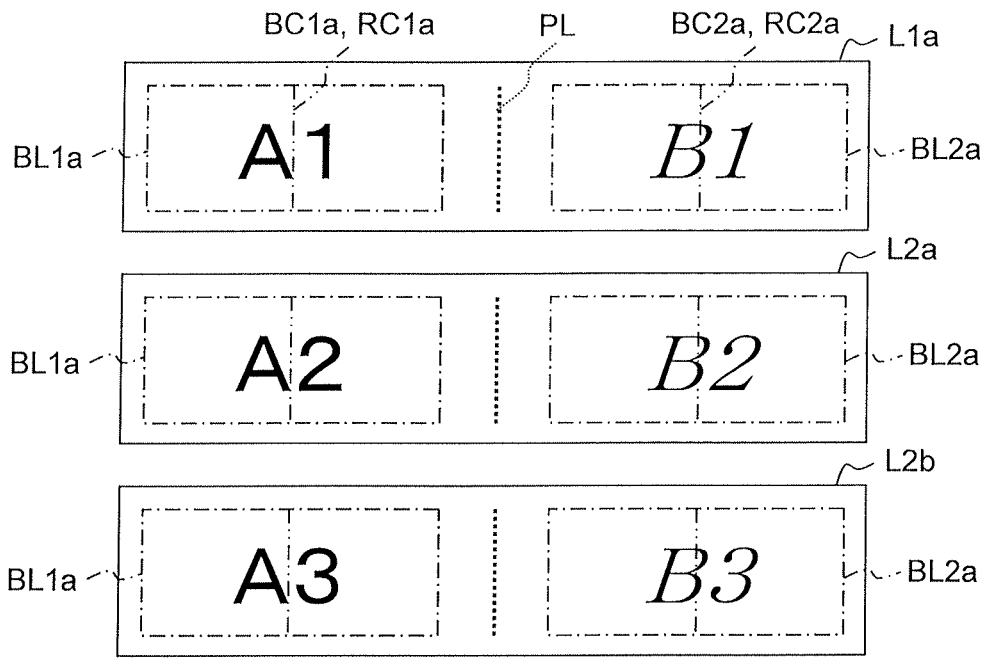
FIG. 8 is an explanatory diagram illustrating a specific example of a first and a second print label.

For example, in each of the print labels L1a, L2a, and L2b illustrated in FIG. 8, the character strings "A1", "A2", and "A3" print-formed in the Gothic font in compliance with format setting that a font in the above described accepted format is a default (Gothic font in this example) are included on the first block BL1a, respectively, and the character strings "B1", "B2", and "B3" print-formed in the Ming-style font in compliance with format setting that a font in the above described accepted format is the Ming-style font are included on the second block BL2a, respectively.

Figure 9:
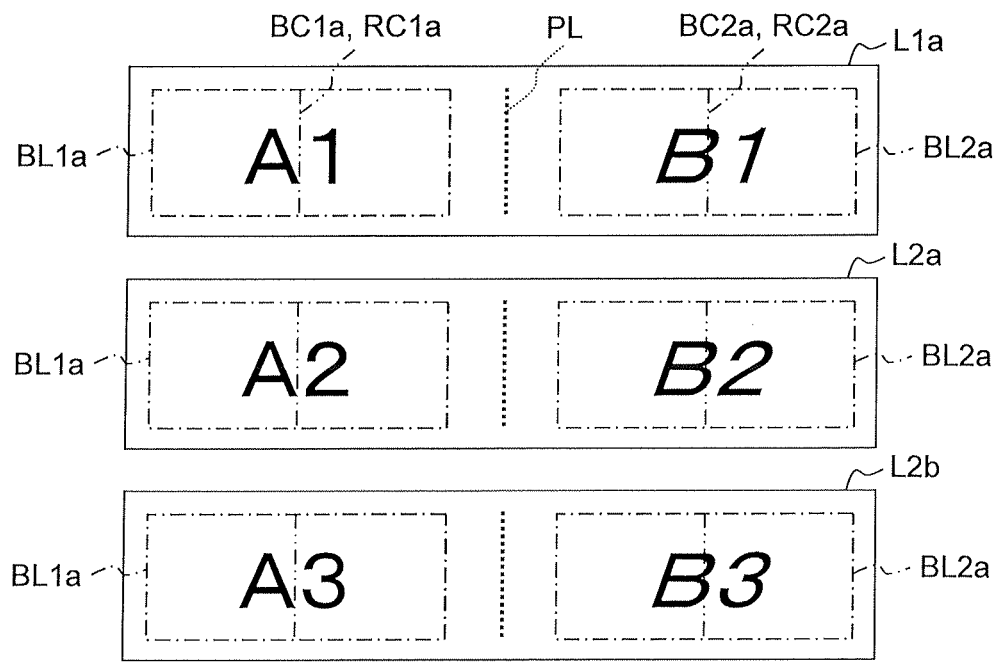
FIG. 9 is an explanatory diagram illustrating a specific example of the first and second print labels.

Moreover, for example, in each of the print labels L1a, L2a, and L2b illustrated in FIG. 9, the character strings "A1", "A2", and "A3" print-formed in the non-italic font in compliance with style setting that the above described accepted style is a default (non-italic font in this example) are included on the first block BL1a, respectively, and the character strings "B1", "B2", and "B3" print-formed in the italic font in compliance with style setting that the above described accepted style is the italic type are included on the second block BL2a, respectively.

Figure 10:
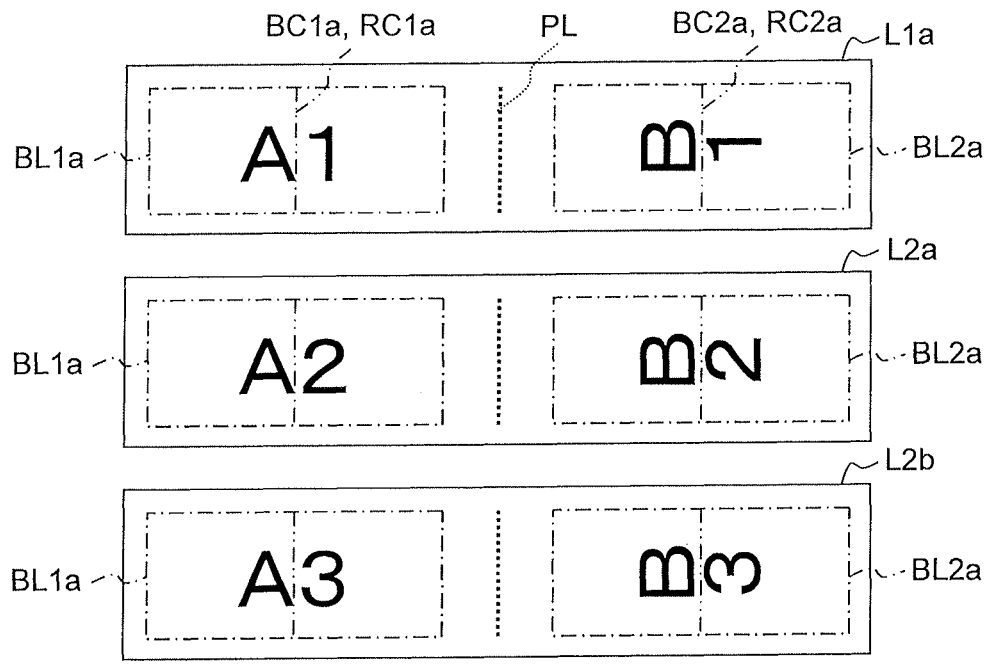
FIG. 10 is an explanatory diagram illustrating a specific example of the first and second print labels.

Moreover, for example, in each of the print labels L1a, L2a, and L2b illustrated in FIG. 10, the character strings "A1", "A2", and "A3" print-formed horizontally in compliance with character string extending direction setting that the above described accepted character string extending direction is a default (horizontal writing in this example) are included on the first block BL1a, respectively, and the character strings "B1", "B2", and "B3" print-formed vertically in compliance with the character string extending direction setting that the above described accepted character string extending direction is vertical writing are included on the second block BL2a, respectively.

Figure 11:
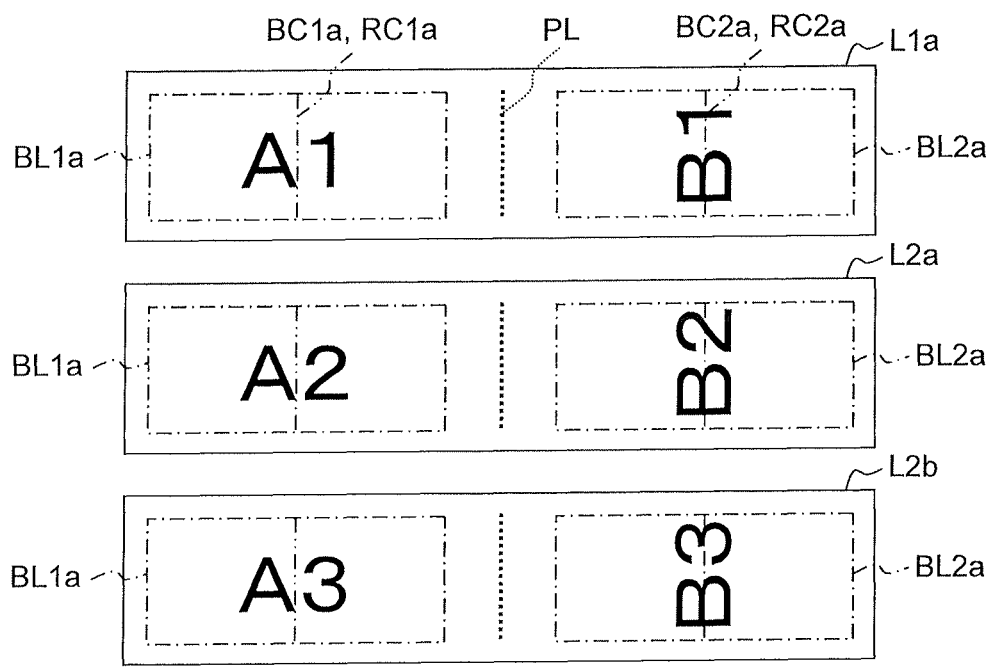
FIG. 11 is an explanatory diagram illustrating a specific example of the first and second print labels.

Moreover, for example, in each of the print labels L1a, L2a, and L2b illustrated in FIG. 11, the character strings "A1", "A2", and "A3" print-formed without rotation in compliance with the printing mode setting that the above described accepted character direction is a default (without rotation in this example) are included on the first block BL1a, respectively, and the character strings "B1", "B2", and "B3" print-formed with the character direction rotated counterclockwise by 90 degrees in compliance with the character direction setting that the above described accepted character direction is rotated counterclockwise by 90 degrees are included on the second block BL2a, respectively.

Figure 12:
FIG. 12 is an explanatory diagram illustrating a specific example of the first and second print labels.

FIG. 12 illustrates first and second print labels L1b, L2f, and L2g corresponding to the above described first and second label images M1b, M2f, and M2g.

In FIG. 12, in the first print label L1b, the character string "001" print-formed on the first block BL1b is included, and the barcode Da expressing the numerals "001" print-formed on the second block BL2b is included. In the second print label L2f, the character string "002" print-formed on the first block BL1b is included, and the barcode Db expressing the numerals "002" print-formed on the second block BL2b is included. In the second print label L2g, the character string "003" print-formed on the first block BL1b is included, and the barcode Dc expressing the numerals "003" print-formed on the second block BL2b is included. At this time, in the first and second print labels L1b, L2f, and L2g, the print is formed so that center positions BC1b and BC2b of the two blocks BL1b and BL2b, respectively, in the tape length direction match center positions RC1b and RC2b of the print objects of the blocks BL1b and BL2b, respectively, in the tape length direction. Moreover, in the first and second print labels L1b, L2f, and L2g, a folding line SL indicating a folding portion in use and print-formed between the two blocks BL1b and BL2b is included. Moreover, at this time, in the first and second print labels L1b, L2f, and L2g, types of the print objects to be arranged in the two blocks BL1b and BL2b are different from each other in the character string and the barcode.

An example of a control procedure executed by the CPU 44 in order to realize the above will be described by referring to FIG. 13.

Figure 13:
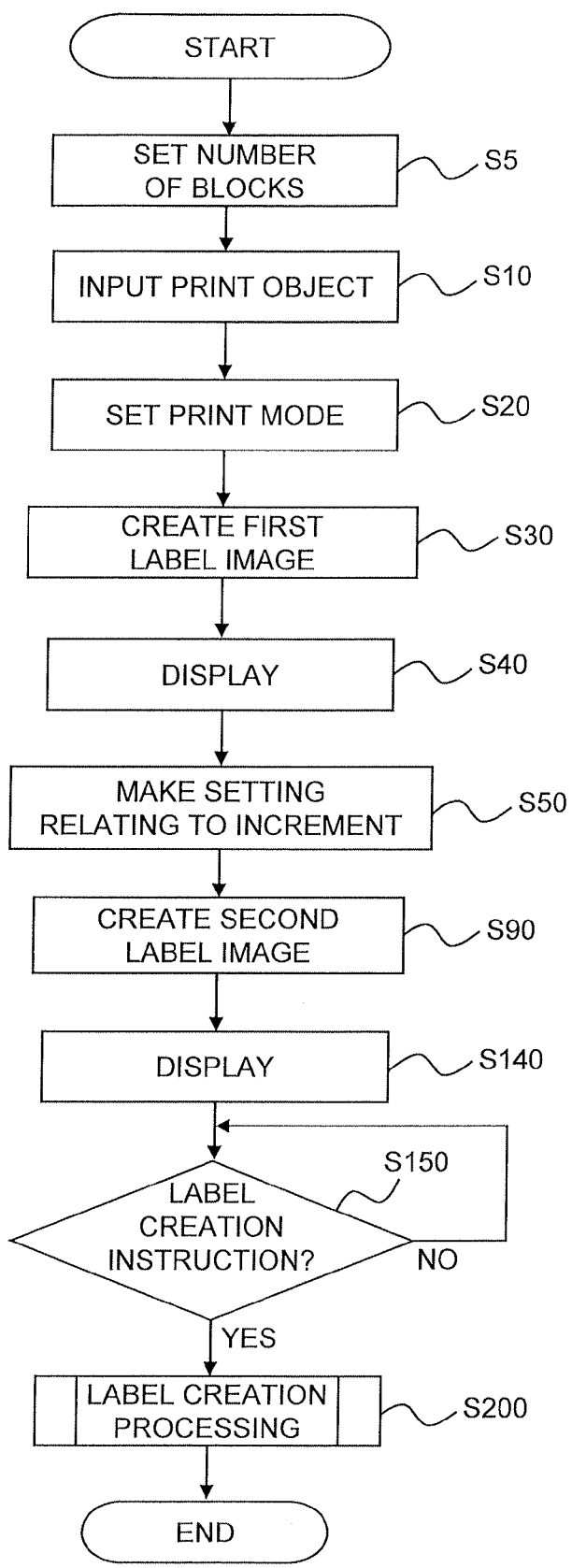
FIG. 13 is a flowchart illustrating a control procedure executed by a CPU.

In FIG. 13, processing illustrated in this flow is started by power-on of the handheld print label producing apparatus 1, for example.

First, at Step S5, the CPU 44 accepts the quantity setting operation of the blocks in one print label through the keyboard portion 3.

Subsequently, the routine proceeds to Step S10, and the CPU 44 accepts the input operation of the print object including the above described print identifiers to be arranged in each of the blocks in the accepted quantity at the above described Step S5 through the keyboard portions 3. In the input operation of the print object, since the print object is inputted while the types of the print object such as the character string, the barcode and the like are set, the input operation of the print object can be also considered as a setting operation of a type of the print object (example of a setting operation of the printing mode) in other words.

Then, at Step S20, the CPU 44 accepts the setting operation of the printing modes different from each other for each of the blocks in the quantity accepted at the above described Step S5 through the keyboard portion 3. The setting operations of the printing mode accepted at this Step S20 include setting operations such as format setting, style setting, character string extending direction setting, character direction setting and the like, for example.

Subsequently, the routine proceeds to Step S30, and the CPU 44 creates one first label image in which the blocks in the quantity accepted at the above described Step S5, each including the print object accepted at the above described Step S10, are aligned in the tape length direction. For example, assume that the input operation of inputting a character string in the blocks in the above described quantity is accepted at the above described Step S10. In this case, at this Step S30, the CPU 44 creates the one first label image in which the plurality of blocks each including the above described character string is aligned in the tape length direction on the basis of any one of the setting operations of the format setting, style setting, character string extending direction setting, and character direction setting accepted at the above described Step S20. Moreover, for example, assume that the input operation of inputting the character string and the barcode in the blocks in the above described quantity is accepted at the above described Step S10. In this case, at this Step S30, the CPU 44 creates one first label image in which the block including the above described character string and the block including the above described barcode are aligned in the tape length direction.

Then, at Step S40, the CPU 44 has the first label image created at the above described Step S30 displayed on the liquid crystal display portion 2 (See FIGS. 6A and 6B). At this time, data of the displayed first label image is temporarily stored in the above described label image memory 48A.

Subsequently, the routine proceeds to Step S50, and the CPU 44 accepts the setting operation relating to an increment for each print label through the keyboard portion 3. The setting operations relating to an increment for each print label accepted at this Step S50 include setting operations such as setting of an increment pattern, setting of the print identifier to be incremented, setting of the increment number, setting of the count number and the like. These setting operations can be considered as setting of an increment mode when the print identifier included in the print object of each of the plurality of blocks in the first label image is incremented for each print label or as quantity setting of the print labels to be produced, and thus, the setting operations relating to an increment for each print label can be considered as the setting operation of the increment mode or the quantity setting operation of the print labels to be produced, in other words.

Then, at Step S90, the CPU 44 sequentially creates at least one second label image by incrementing, for each print label, the print identifier included in the print object of each of the plurality of blocks in the first label image in the increment mode based on the setting relating to an increment for each print label accepted at the above described Step S50. For example, assume that the first label image in which the plurality of blocks each including the character string is aligned in the tape length direction has been created at the above described Step S30. In this case, at this Step S90, the CPU 44 creates at least one second label image in which the print identifier included in the character string of each of the plurality of blocks in the first label image is incremented for each print label in the increment mode based on the setting relating to the increment for each print label accepted at the above described Step S50. Moreover, for example, assume that the first label image in which the block including the character string and the block including the barcode are aligned in the tape length direction has been created at the above described Step S30. In this case, at this Step S90, the CPU 44 creates at least one second label image in which the print identifier of the character string and the print identifier of the barcode of each of the plurality of blocks in the first label image are incremented for each print label in the increment mode based on the setting relating to an increment for each print label accepted at the above described Step S50.

Subsequently, the routine proceeds to Step S140, and the CPU 44 has the one first label image created at the above described Step S30 together with the at least one second label image created at the above described Step S90 displayed on the liquid crystal display portion 2 (see FIGS. 7A, 7B, and 7C). At this time, data of the displayed first and second label images is temporarily stored in the above described label image memory 48A.

Then, at Step S150, the CPU 44 determines whether or not a desired label production instruction has been inputted through the keyboard portion 3. The determination at Step S150 is not satisfied (S150: NO) until the label production instruction is inputted and the CPU 44 stands by in a loop. If the label creation instruction is inputted, the determination at Step S150 is satisfied (S150: YES), and the routine proceeds to Step S200.

At Step S200, the CPU 44 executes label production processing (details will be described later) of creating the one first print label and the at least one second print label corresponding to the one first label image and the at least one second label image displayed on the liquid crystal display portion 2 at the above described Step S140 by using the printing mode setting accepted at the above described Step S20. At this time, the CPU 44 creates the above described one first print label and the at least one second print label while the center position in the tape length direction of each of the blocks is matched with the center position in the tape length direction of the print object of the block in each print label. Moreover, if a predetermined partition line addition instruction has been inputted through the keyboard portion 3 at an appropriate timing, the CPU 44 creates the above described one first print label and at least one second print label with the above described partition line PL added between the adjacent plurality of blocks in each of the printed matters (see FIGS. 8 to 11). Moreover, if a predetermined folding line addition instruction has been inputted through the keyboard portion 3 at an appropriate timing, the CPU 44 creates the above described one first print label and the at least one second print label by adding the above described folding line SL between the block in which the character string is arranged and the block in which the barcode is arranged in each printed matter (see FIG. 12). Subsequently, the processing illustrated in this flow is finished.

A detailed procedure of the label production processing at the above described Step S200 will be described by referring to FIG. 14.

Figure 14:
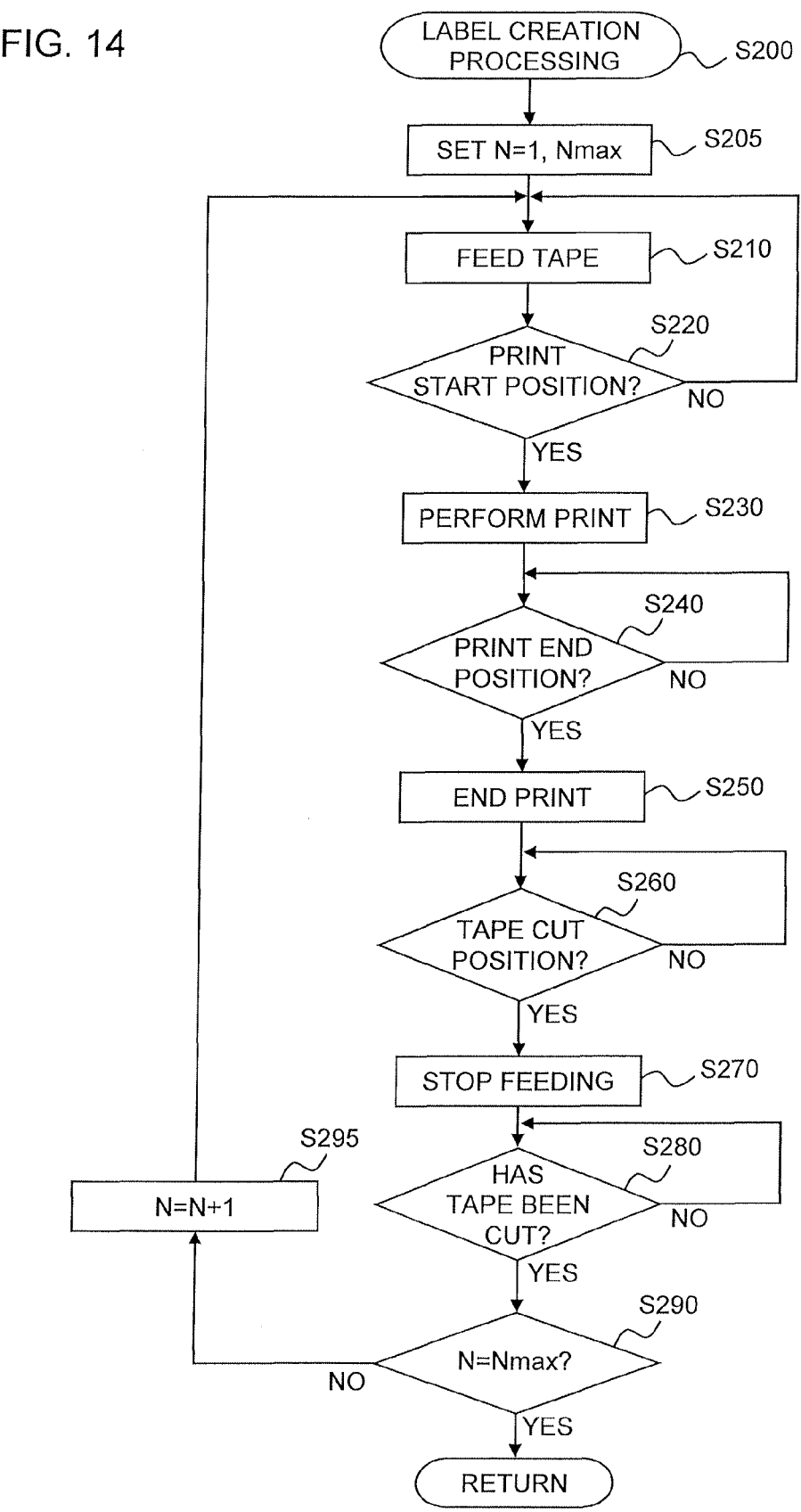
FIG. 14 is a routine illustrating a detailed procedure of Step S200.

In FIG. 14, at Step S205, the CPU 44 sets to one a value of a variable N indicating the order of a label image relating to the print label to be produced in a plurality of label images displayed on the liquid crystal display portion 2 at Step S140 and sets a maximum value Nmax of the value of the variable N. For example, if the quantity of the label images displayed on the liquid crystal display portion 2 at the above described Step S140 is three, Nmax=3 is set.

Then, at Step S210, the CPU 44 outputs a control signal to the motor drive circuit 63 and starts driving of the motor 21. As a result, the gear 214 is rotationally driven, rotation of the platen roller 182, the pressing roller 192 and the like is started, and feeding of the cover film 51, the base tape 53, and the label tape 80 with print is started.

Subsequently, the routine proceeds to Step S220, and the CPU 44 determines whether or not a transport direction position of the cover film 51 has arrived at a desired print start position by a known method. The determination at Step S220 is not satisfied (S220: NO) until the print start position is arrived at, the routine returns to the above described Step S210, and the similar procedure is repeated. If the print start position is arrived at, the determination at Step S220 is satisfied (S220: YES), and the routine proceeds to Step S230.

At Step S230, the CPU 44 outputs a control signal (print data) based on the label image in the order corresponding to the value of the variable N at this point of time in the first and second label images displayed on the liquid crystal display portion 2 at the above described Step S140 to the thermal head drive circuit 61. As a result, the thermal head 16 is driven in accordance with the above described print data, and formation of the print object corresponding to the print data onto the cover film 51 is started.

Then, at Step S240, the CPU 44 determines whether or not the transport direction position of the cover film 51 has arrived at a desired print end position by the known method. The determination at Step S240 is not satisfied (S240: NO) until the print end position is arrived at, and the determination stands by in a loop. If the print end position is arrived at, the determination at Step S240 is satisfied (S240: YES), and the routine proceeds to Step S250.

At Step S250, the CPU 44 outputs the control signal to the thermal head drive circuit 61, stops driving of the thermal head 16, and ends print.

Subsequently, the routine proceeds to Step S260, and the CPU 44 determines whether or not the transport direction position of the label tape 80 with print has arrived at a tape cut position by the known method. The determination at Step S260 is not satisfied (S260: NO) until the tape cut position is arrived at, and the CPU 44 stands by in a loop. If the tape cut position is arrived at, the determination at Step S260 is satisfied (S260: YES), and the routine proceeds to Step S270.

At Step S270, the CPU 44 outputs the control signal to the motor drive circuit 63 and stops driving of the motor 21. As a result, rotation of the platen roller 182, the pressing roller 192 and the like is stopped, and feeding of the cover film 51, the base tape 53, and the label tape 80 with print is stopped.

Then, at Step S280, the CPU 44 determines whether or not the cutter has been driven by operation of the cut button 4, and the label tape 80 with print has been cut. The determination at Step S280 is not satisfied (S280: NO) until the label tape 80 with print is cut, and the CPU 44 stands by in a loop. If the label tape 80 with print is cut, the determination at Step S280 is satisfied (S280: YES), and the routine proceeds to Step S290. Since the label tape 80 with print is cut, the print label corresponding to the label image in the order corresponding to the value of the variable N at this point of time in the first and second label images displayed on the liquid crystal display portion 2 at the above described Step S140 is produced.

At Step S290, the CPU 44 determines whether or not the value of the variable N has reached the maximum number Nmax. The determination at Step S290 is not satisfied (S290: NO) until the value of the variable N reaches the maximum number Nmax, and the routine proceeds to Step S295. At Step S295, the CPU 44 adds one to the value of the variable N and then, returns to the above described Step S210 and repeats the similar procedure. On the other hand, at Step S290, if the value of the variable N has reached the maximum number Nmax, the determination at Step S290 is satisfied (S290:

YES), and this routine is finished. As described above, the first and second print labels corresponding to the first and second label images displayed on the liquid crystal display portion 2 at the above described Step S140 are produced.

As described above, in the present embodiment, the plurality of blocks is set in each print label. As a result, the printing mode setting is made different among the plurality of blocks, and various types of prints can be displayed for each block in one print label. Moreover, it becomes possible to uniformly arrange the blocks in the print label, and to form print of a partition line and the like between the block, for example. As a result of these arrangements, expressive power by the print label can be widely expanded, and convenience of the operator can be improved. Even if the plurality of blocks is set in one print label as above, the print identifier of the print object included in each block can be incremented by the unit of the print label (not by the unit of block). As a result, if print formation contents in the print label including the plurality of blocks are to be produced in a desired number while being continuously changed in compliance with predetermined regularity, all the print labels can be produced easily and efficiently with a simple operation.

Moreover, particularly in the present embodiment, one first label image in which the plurality of blocks each including the character string based on any one of the setting operations of the format setting, the style setting, the character string extending direction setting, and the character direction setting accepted as described above is aligned in the tape length direction is created. Then, the at least one second label image in which the print identifier of the character string of each of the plurality of blocks is incremented for each print label in the increment mode accepted as described above is created. As a result, various types of prints can be reliably displayed in each block in the one print label by making settings of the format, the style, the character string extending direction, the character direction and the like different among the character strings of each of the plurality of blocks.

Moreover, particularly in the present embodiment, the one print label and the at least one print label corresponding to the first and second label images are created with the partition line PL added between the adjacent plurality of blocks in each print label. As a result, various types of prints can be displayed for each boundary between the blocks in one print label.

Moreover, particularly in the present embodiment, the one first image in which the block including the character string and the block including the barcode based on the setting operation according to the print object type accepted as described above are aligned in the tape length direction is created. Then, the at least one second label image in which the print identifier of the character string of the block including the character string and the print identifier of the barcode of the block including the barcode are incremented for each print label in the increment mode accepted as described above is created. As a result, by forming a character string on one of the blocks and by forming a barcode on the other blocks in the plurality of blocks, it is possible to form a character string area and a barcode area in one print label. As a result of this arrangement, a so-called print label with a barcode can be produced easily and efficiently.

Moreover, particularly in the present embodiment, the one first print label and the at least one second print label corresponding to the first and second label images are created with the folding line SL added between the block including the character string and the block including the barcode in each print label. As a result, when the above described print label is to be used by being folded at a boundary between the character string area and the barcode area, the operator can clearly recognize the folding position.

Moreover, particularly in the present embodiment, the one first print label and the at least one second print label corresponding to the first and second label images are created such that the center position of each block in the tape length direction is matched with the center position of the print object of the block in the tape length direction in each print label. As a result, in each of the created print labels, the print object arranged in each of the plurality of blocks can be uniformly aligned, and appearance of the print label can be improved.

The present disclosure is not limited to the above described embodiment but is capable of various deformations within a range not departing from the gist and technical idea thereof.

Arrows illustrated in FIG. 5 indicate an example of flows of signals and do not limit the flow directions of the signals.

Moreover, a flowchart and a routine illustrated in FIGS. 13 and 14 do not limit the present disclosure to the illustrated procedures but are capable of addition/deletion, a change of orders or the like of the procedures within a range not departing from the gist and technical idea of the disclosure.

Moreover, other than those described above, methods by the above described embodiment and the like may be combined in use as appropriate.

What is claimed is:

1. A printer comprising:
a feeder configured to feed a print-receiving tape; and
a printing head configured to apply print of a desired print object to said print-receiving tape fed by said feeder,
the printer being configured to continuously produce a plurality of printed matters comprising said print object formed on said print-receiving tape, respectively, in a predetermined order extending along a transport direction of said feeder,
the printer further comprising:
a print object acceptance portion configured to accept an input operation of said print object comprising a print identifier that is arranged in each of a plurality of blocks which can be set in plural in a tape length direction with respect to one of said plurality of printed matters and is able to be incremented in compliance with predetermined regularity;
a printing mode setting acceptance portion configured to accept a setting operation of printing modes different from each other for each of said plurality of blocks;
a first image creating portion configured to create a first image of one first printed matter in which said plurality of blocks each comprising said print object is aligned in the tape length direction on the basis of an acceptance result of said print object acceptance portion and said printing mode setting acceptance portion;
a first display device configured to display said first image created by said first image creating portion;
an increment mode acceptance portion configured to accept a setting operation of an increment mode when said print identifier of said print object of each of said plurality of blocks of said first image is incremented for each printed matter;
an increment quantity acceptance portion configured to accept a quantity setting operation of said each printed matter to be produced;
a second image creating portion configured to create a second image of at least one second printed matter in which said print identifier is incremented for each printed matter in the increment mode accepted by said increment mode acceptance portion and set to a quantity based on an acceptance result of said increment quantity acceptance portion;

a second display device configured to display said first image and said second image created respectively by said first image creating portion and said second image creating portion together; and a printing control portion configured to control said feeder and said printing head so that said one first printed matter and said at least one second printed matter corresponding to said first image and said second image displayed on said second display device are created by using a printing mode setting accepted by said printing mode setting acceptance portion.

2. The printer according to claim 1, wherein:

said first image creating portion creates said first image of said one first printed matter in which a plurality of character string blocks each comprising a character string as said print object is aligned along the tape length direction, on the basis of any one of setting operations among format setting, style setting, character string extending direction setting, and character direction setting as said printing mode setting accepted by said printing mode setting acceptance portion; and said second image creating portion creates said second image of said at least one second printed matter in which said print identifier of said character string of each of said plurality of character string blocks is incremented for each printed matter in the increment mode accepted by said increment mode acceptance portion.

3. The printer according to claim 2, wherein:

said printing control portion controls said feeder and said printing head so that said one first printed matter and said at least one second printed matter corresponding to said first image and said second image are created with a partition line added between said plurality of blocks adjacent in each printed matter.

4. The printer according to claim 1, wherein:

said first image creating portion creates said first image of said one first printed matter in which a character string block comprising a character string as said print object and a barcode block comprising a barcode as said print object are aligned along the tape length direction, on the basis of a setting operation of a print object type as said printing mode setting accepted by said printing mode setting acceptance portion; and said second image creating portion creates said second image of said at least one second printed matter in which said print identifier of said character string of said character string block and said print identifier of said barcode of said barcode block are incremented for each printed matter in the increment mode accepted by said increment mode acceptance portion.

5. The printer according to claim 4, wherein:

said printing control portion controls said feeder and said printing head so that said one first printed matter and said at least one second printed matter corresponding to said first image and said second image are created with a folding line indicating a folding portion in use between said character string block and said barcode block in each printed matter.

6. The printer according to claim 1, wherein:

said printing control portion controls said feeder and said printing head so that said one first printed matter and said at least one second printed matter corresponding to said first image and said second image are created so that a center position of each block in the tape length direction is matched with a center position of said print object of the block in the tape length direction in each of the printed matters.

\* \* \* \* \*